US007337984B2

(12) United States Patent
Shekarriz et al.

(10) Patent No.: US 7,337,984 B2
(45) Date of Patent: Mar. 4, 2008

(54) ELECTROSTATIC ATOMIZER AND METHOD OF PRODUCING ATOMIZED FLUID SPRAYS

(75) Inventors: Alireza Shekarriz, Lake Oswego, WA (US); Joseph G. Birmingham, Vancouver, WA (US)

(73) Assignee: Joseph Gerard Birmingham, Vancouver, WA (US)

( * ) Notice: Subject to any disclaimer, the term of this patent is extended or adjusted under 35 U.S.C. 154(b) by 0 days.

(21) Appl. No.: 10/917,824

(22) Filed: Aug. 13, 2004

(65) Prior Publication Data

US 2005/0017102 A1 Jan. 27, 2005

Related U.S. Application Data

(63) Continuation of application No. 10/271,013, filed on Oct. 15, 2002, now Pat. No. 6,802,456.

(60) Provisional application No. 60/329,137, filed on Oct. 12, 2001.

(51) Int. Cl.

| | |
|---|---|
| ***A01G 23/10*** | (2006.01) |
| ***B05B 5/025*** | (2006.01) |
| ***B05B 5/00*** | (2006.01) |
| ***F23D 11/32*** | (2006.01) |

(52) U.S. Cl. .......................... 239/3; 239/690; 239/695

(58) Field of Classification Search .................... 239/3, 239/690, 695, 4, 102.1, 589

See application file for complete search history.

(56) References Cited

U.S. PATENT DOCUMENTS 3,769,624 A 10/1973 Lee et al.
4,166,799 A * 9/1979 Giacobbe .................... 252/374
4,255,777 A 3/1981 Kelly
4,439,980 A 4/1984 Biblarz et al.
4,577,135 A 3/1986 Jefrries et al.
4,784,323 A 11/1988 Miller
5,062,573 A 11/1991 Makimura
5,378,957 A 1/1995 Kelly
5,647,543 A 7/1997 Ma
5,808,300 A * 9/1998 Caprioli ...................... 250/288
6,227,465 B1 5/2001 Kelly
6,318,648 B1 11/2001 Kelly
6,569,383 B1 * 5/2003 Nelson et al. ............. 422/68.1
6,649,907 B2 * 11/2003 Ebeling et al. ............. 250/288
6,802,456 B2 * 10/2004 Shekarriz et al. .............. 239/3

(Continued)

FOREIGN PATENT DOCUMENTS

WO WO 01/21319 A1 3/2001

OTHER PUBLICATIONS

Olumee et al., Droplet Dynamics Changes in Electrostatic Sprays of Methanol-Water Mixtures, J. Phys. Chem. A, No. 102, 1998, pp. 9154-9160.

(Continued)

*Primary Examiner*—William C Doerrler
(74) *Attorney, Agent, or Firm*—Gary C. Cohn PLLC

(57) ABSTRACT

Fluids are atomized using a miniaturized electrostatic micro-injector. The microinjectors are capable of producing uniform droplets in several spray modes, and metering and dispersing very small volume fluids. The atomizer is useful in carburetion systems for internal combustion engines, to prepare samples for analytical methods such as MALDI, for fluid filtration and separation, and in other applications.

14 Claims, 2 Drawing Sheets

U.S. PATENT DOCUMENTS

| | | | | |
|---|---|---|---|---|
| 2002/0185550 | A1 | 12/2002 | Ganan-Calvo | |
| 2005/0003555 | A1* | 1/2005 | Tubbs et al. | 436/514 |
| 2005/0123947 | A1* | 6/2005 | Quake et al. | 435/6 |
| 2005/0153344 | A1* | 7/2005 | Diamond et al. | 435/6 |

OTHER PUBLICATIONS

Ganan-Calvo et al., Current and Droplet Size in the Electrospraying of Liquids, J. Aerosol Sci. vol. 28, No. 2, 1997, pp. 249-275.

Hammad et al., Turbulence in Confined Axisymmetric Jets of Newtonian and Non-Newtonian Fluids, ASME, 1998, pp. 1-8.

Shekarriz, Challenges in Thermal Systems Miniaturization, Heat Transfer Engineering 21, 2000, pp. 1-2.

Stuetzer, Ion Drag Pressure Generation, Journal of Applied Physics, vol. 30, No. 7, Jul. 1959, pp. 984-994.

Takashima et al., I-V Characteristics and Liquid Motion in Needle-To-Plane and Razor Blade-To-Plane Configurations in Transformer oil and Liquid Nitrogen, IEEE, vol. 23, No. 4, Aug. 1988, Pg.

Lee et al., Fuel Injection by a Thermal Microinjector, University of California Mechanical and Aerospace Engineering Dept.

Galambos et al., A Surface Micromachined Electrostatic Drop Ejector, Transducers '01 Eurosensors XV, 2001.

Bryan et al., Analysis of 2-Dimensional Flow Field Generated by a 1-Electrode-Pair Ion-Drag Pump, IEEE, vol. 1, No. 3, Jun. 1994, pp. 459-467.

Bolt et al., Internal-Combustion Engines, pp. (9-78)-(9-101).

Phase Dispersion, Liquid-In-Gas Dispersions, pp. (18-48)-(18-56).

* cited by examiner

ELECTROSTATIC ATOMIZER AND METHOD OF PRODUCING ATOMIZED FLUID SPRAYS

CROSS-REFERENCE TO RELATED APPLICATION

This application is a continuation of application Ser. No. 10/271,013, filed Oct. 15, 2002, now U.S. Pat. No. 6,802,456, and claims benefit of provisional application 60/329,137, filed Oct. 12, 2001.

BACKGROUND OF THE INVENTION

This invention relates to an atomizer that creates liquid droplets through application of an electrical field.

Many processes depend on the formation of liquid droplets of controllable size. Examples of this include internal combustion engines, ink jet and bubble jet printers. Performance of most combustion engines depends strongly on how well the liquid fuel is injected into the combustion chamber or inside the carburetion system. The process of combustion is limited by the size distribution of fuel droplets sprayed into the air stream. The purpose of spray atomization is to create a very small size distribution of droplets with high surface area for heat and mass transfer. Typically, heat and mass transfer scale as $d^{-2}$ (d is the droplet diameter) while the aerodynamic response time of the droplets scales as $d^2$. Thus, the smaller the droplets, the more rapidly they evaporate while they are given more time for evaporation within the air flow stream.

While light fuels like octane have low vapor pressure and evaporate fairly rapidly, heavy hydrocarbons such as diesel and JP8 will take more heat and longer time to completely vaporize in the combustion chamber. It is therefore common to produce a much finer mist using high-pressure atomizers in diesel engines. The injection pressure delivered by plunger pumps to the spray nozzles in a diesel engine usually range from 1,500 to 7,000 psi. At these pressures, the droplets range in size from 10 to 100 μm with a Sauter mean diameter of approximately 50 μm.

In spark ignition engines, the issue of broad size distribution in the droplets causes less of a problem than in compression ignition engines. In compression ignition engines, the fine droplets burn too fast, and the larger droplets don't follow the flow path, leading to unburned hydrocarbons emissions or the formation of deposits in the engine.

However, uniform droplet size distribution has been difficult to achieve using conventional high-pressure spray atomizers. The broadening of the droplet size distribution can be attributed to several different processes. The atomization process, which is characterized as highly chaotic at the onset of jet breakup, results in different break-up wavelengths and therefore different droplet diameters. Further, after each droplet is formed and is being issued into the flow stream, small satellite droplets form in its tail. These two mechanisms are inherently inter-dependent in that the wavelength of the column of liquid injected out of a nozzle (or what forms immediately after the liquid jet leaves a nozzle) dictate the shape of the main droplets and number of trailing droplets. Some of the droplets tend to coalesce after injection to form larger droplets. The rate of collision and coalescence is a function of the turbulence intensity in the flow stream, the initial droplet size distribution and the number density of the droplets.

In some jet engines, fuel and air are mixed by dispersing the fuel into a high velocity stream of air, where the air turbulence provides the energy for atomization (so-called air-blast mixing). This approach suffers from the drawbacks that (1) uniform droplets are not created and (2) atomization depends on the air velocity, which can vary.

Recent efforts have focused on the electrostatic dispersion of the fuel droplets to reduce coalescence. However, the potential payoff for focusing on this mechanism is extremely low. Researchers have been very interested in the process of jet instability and liquid column breakup. It turns out that the mode of growth of instability waves tend to lock in on external excitations, overriding the natural frequency of the fastest growing waves. For example, an acoustic force is commonly used for controlling jet breakup and atomization. However, acoustics cannot have direct impact on satellite droplet formation. A significant amount of research has also been vested in suppression of satellite droplets, mainly in the ink jet and bubble jet printer industries. The concept of "tail cutting" has been explored and demonstrated in microinjectors using a recently developed thermal ink jet atomizer. Using diesel fuel, approximately 30 μm droplets have been issued out of a 30 μm nozzle.

A method by which droplets of controllable size can be produced using low energies and pressures would be desirable.

In other applications, it is desirable to be able to dispense small volumes of fluids in the form of small droplets. Conventional methods of atomizing fluids do not provide the fine control needed to atomize small quantities of fluids efficiently. This leads to poor results and waste of the fluids.

SUMMARY OF THE INVENTION

In one aspect this invention is an atomizer for a liquid comprising

A) at least one microinjector including (1) an orifice through which the liquid is brought in contact with a pin emitter and (2) a conductive pin emitter extending outwardly from said orifice, the pin emitter having a radius of curvature in at least one location external to said orifice of no greater than 500 μm;

B) means for introducing the liquid to be atomized through the orifice and to the pin emitter, and C) means for connecting said pin emitter to a voltage source.

In a second aspect, this invention is a method of producing liquid droplets comprising I) introducing a liquid into an atomizer comprising A) at least one microinjector including (1) an orifice through which the liquid is brought in contact with a pin emitter and (2) a conductive pin emitter extending outwardly from said orifice, the pin emitter having a radius of curvature in at least one location external to said orifice of no greater than 500 μm;

B) means for introducing the liquid to be atomized through the orifice and to the pin emitter, and C) means for connecting said pin emitter to a voltage source;

II) bringing the liquid into contact with the pin emitter, and

III) applying sufficient voltage to the pin emitter such that the liquid is emitted from the pin emitter as a plurality of droplets.

In a third aspect, this invention is a carburetion system for an internal combustion engine, comprising I) an outlet for a mixture of atomized fuel droplets and air;

II) an air inlet which is in fluid communication with said outlet such that during operation air passes through said inlet, is mixed with fuel droplets and passes through the outlet;

III) an atomizer that is in fluid communication with said outlet and which emits a plurality of fuel droplets into a stream of air that passes from the air inlet to the outlet, wherein said atomizer includes A) at least one microinjector including (1) an orifice through which the fuel is brought in contact with a pin emitter and (2) a conductive pin emitter extending outwardly from said orifice, the pin emitter having a radius of curvature in at least one location external to said orifice of no greater than 500 μm;

B) means for introducing the fuel through the orifice and to the pin emitter, and C) means for connecting said pin emitter to a voltage source.

DETAILED DESCRIPTION OF THE INVENTION

Figure 1:
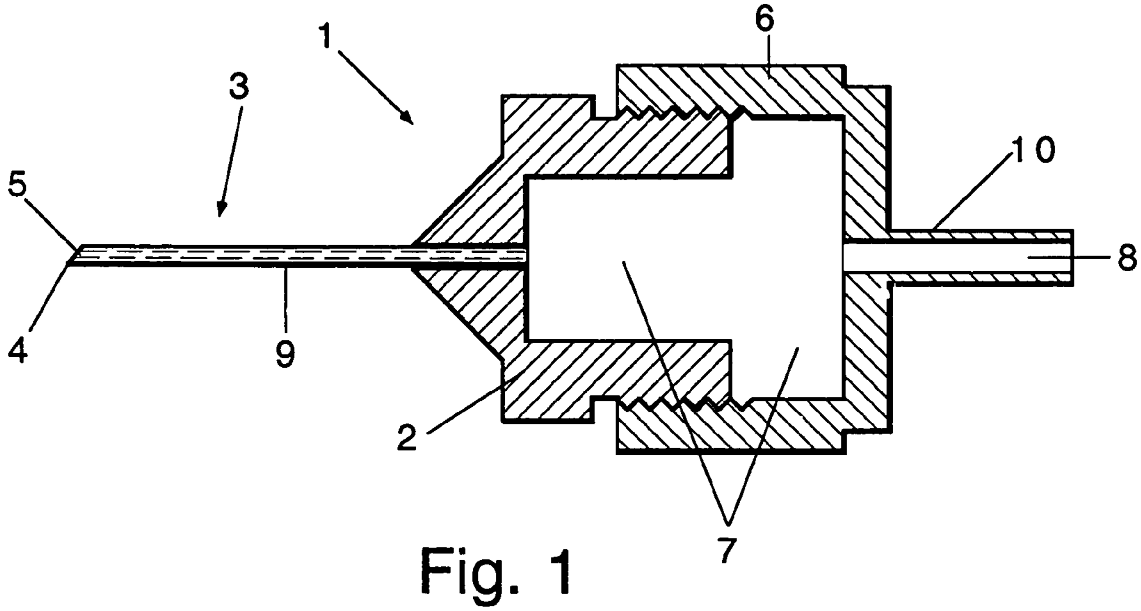
FIG. 1 is a side view, partially in section, of an embodiment of a microinjector of the invention.

An illustrative embodiment of the atomizer of the invention is shown in FIG. 1. In FIG. 1, atomizer 1 includes microinjector 3. Microinjector 3 includes orifice 5 and pin emitter 4. Pin emitter 4 is external to orifice 3 in the sense that fluid to be atomized passes through orifice 5 to reach pin emitter 4, where it is atomized and dispersed as a plurality of fine droplets. Pin emitter 4 in this embodiment is the terminus of hollow needle 9. Hollow needle 9 is in liquid communication with reservoir 7, which, in turn, is in liquid communication with conduit 8. The liquid to be atomized is introduced to the orifice and pin emitter through conduit 8, reservoir 7 and the bore in hollow needle 9. Microinjector 3 is supported by base support member 2. In this embodiment, support member 2 is mounted onto base member 6. The internal walls of base member 6 and base 2 define reservoir 7.

The atomizer includes a means for connecting the pin emitter to a voltage source. In the embodiment shown in FIG. 1, needle 4, base 2 and base support member 6 are all electrically conductive materials that are in turn connected or connectable to a voltage source, so that an applied electrical current applied to base support member 6 through line 10 is conducted through base 2 and needle 9 to pin emitter 5. Alternately, needle 9 may communicate directly with the voltage source via a wire, printed circuit or line that bypasses base 2 and base support member 6, or which passes through reservoir 7. Any type of circuitry that can deliver the required voltage and current to pin emitter 5 is suitable.

The embodiment shown in FIG. 1 is a preferred one, in which the pin emitter forms the tip of a hollow needle, and the fluid to be atomized is brought to the pin emitter through the needle bore. It is also possible, but much less preferred, to design the microinjector such that the pin emitter protrudes through the orifice, so that the fluid to be atomized passes through the orifice on the outside of the pin emitter, where it is dispersed into droplets. For example, a pin emitter of circular cross-section may protrude from a ring-shaped orifice that is concentric with the pin emitter. In this less preferred embodiment, surface tension forces and/or an applied hydrodynamic pressure cause the fluid to pass through the orifice and wet the protruding surface of the pin emitter.

The atomizer may include a collector electrode, which is spaced at a distance from the pin emitter. The collector electrode is either grounded or in electrical connection with the voltage source, in which case the collector electrode is of the opposite polarity as the pin emitter. Any grounded part can function as the collector electrode. However, unless the distance between the collector electrode and pin emitter is small (in comparison with the radius of curvature of the pin emitter), the collector electrode has very little effect on droplet formation. However, the collector electrode may affect the trajectory of the droplets once they are formed.

During operation, voltage is applied to the pin emitter, creating a charge on the pin emitter and a local electrical field with a gradient in the field strength. The electrical field induces pressure gradients on the fluid for driving its flow and atomization. These forces can be expressed as $$f_E = Q\vec{E} - \frac{1}{2}E^2\nabla\varepsilon\left[\frac{1}{2}\rho E^2\left(\frac{\partial\varepsilon}{\partial\rho}\right)_T\right] \quad (1)$$

where ∈ is the dielectric permittivity of the fluid, ρ is the mass density, Q is the electric field space charge density, T is the temperature and E is the applied electric field strength. The first term on the right-hand side of Equation (1) represents the force on the free charges present and gives rise to the so-called Coulomb force, which is the primary driving force in most ion-drag pumps for pumping a liquid or gas in single-phase mode. The second and third terms are the electrostrictive force and the dielectrophoretic (DEP) force. Q is defined as $$Q = \frac{I}{(u + \mu E)A} \quad (2)$$

where I is the current, u is the bulk fluid velocity, μ is the ion mobility, E is the electric field strength and A is the flow cross-section area.

The pressure rise produced by the electrical field is related to the driving voltage and geometrical parameters. For a simple design involving laminar flow and a circular orifice cross-section, the pressure rise required to generate droplets is related to the droplet escape velocity, ion mobility and permittivity as follows:

$$\Delta p = \frac{\varepsilon u^2}{6\mu^2} \quad (3)$$

where u is the average droplet escape velocity in m/s, μ is the ion mobility in $m^2$/volt-sec, and ∈ is the permittivity in C/volt-m.

The pressure gradient created by an electrical field can be related to applied voltage according to the relationship:

$$\Delta p_e = \frac{3}{2}\varepsilon\left(\frac{V_1 - V_o}{\delta}\right) \tag{4}$$

where $V_1$ is the applied voltage, $V_0$ is the threshold breakdown voltage (which is very small for liquids) and δ is the inverse of the surface curvature of the pin emitter at the point of smallest radius of curvature (or, if smaller, the inter-electrode spacing).

Thus, at any given applied voltage, the electrical field gradient that is created will be greatest at that point of the pin emitter at which the radius of curvature is smallest. Therefore, it is important that the radius of curvature of the pin emitter be small at one place at least, so that the necessary applied voltages remain relatively small. For many fluids, electrical field gradients in the range of from about 1 to about 1000 kV/mm, especially from about 5 to about 400 kV/mm, particularly from about 10 to 200 kV/mm are sufficient to initiate and continue droplet formation. Electrical field gradients of these magnitudes can be produced at applied voltages in the desirable range of 100-25,000 volts, at microampere currents or less, when the radius of curvature of the pin emitter is no greater than 500 μm, preferably no greater than 250 μm, even more preferably no greater than about 150 microns, and especially from about 1-50 μm. At these pin emitter sizes, pressure drops needed to obtain atomization are usually in the range of about 0.001 bar to 0.1 bar. These pressure drops are several orders of magnitude smaller than required in conventional types of atomizers.

The pin emitter may have, for example, a conical shape, a cylindrical shape, a rectangular shape, a round tip, a sharp or pointed tip, or a more complex curvature. It is made of any material capable of being charged in response to an applied voltage, with metals such as steel, aluminum, copper, silver, gold and platinum being of particular interest. Pin emitters with sharpened tips are especially preferred. The electrical field gradient generated by the pin emitter is usually greatest at that location where the curvature of the pin emitter is highest, and droplets preferentially form and are emitted at this location. In the case of a pin emitter with a sharpened tip, the sharpened tip is the region of greatest surface curvature, and droplet formation usually occurs there.

A particularly preferred type of microinjector is a hollow needle having a pointed or sharpened tip, having an outside diameter of up to 1 mm, preferably up to 700 μm, especially from about 5 to about 400 μm, most preferably from about 10 to about 250 μm.

The microinjector is operated by applying a voltage to the pin emitter and bringing the fluid into contact with the pin emitter through the orifice. As discussed above, voltages required will depend somewhat on microinjector geometry and the particular fluid being atomized. In addition, the voltage required to initiate droplet formation varies depending on whether the voltage is constant or pulsed. In general, however, applied constant voltages in the range of about 100 V to about 25 kV, especially from about 1-20 kV, most preferably about 3-15 kV, are suitable for producing fluid droplets.

For a given type of current and at a given mass flow rate, increasing voltage tends to reduce droplet size. This effect can be estimated using the relationship expressed by the Raleigh limit:

$$I = 12\sqrt{2}\left(\frac{\varepsilon\gamma_o}{d^3}\right)^{\frac{1}{2}} Q \tag{5}$$

where I is the current, ∈ is the dielectric constant of the fluid, γ is surface tension, d is the droplet diameter and Q is mass flow rate through the orifice. The Raleigh limit gives the maximum current flow for a given fluid at a given particle size.

Thus, the invention provides a way of making droplets of predetermined sizes (within some range) by varying the applied voltage. This effect will be dependent on the geometry of the system and the fluid (and waveform of the applied voltage), but is easily determined empirically for any given system.

Applicants have also found that various spray modes can be produced through varying the applied voltages, particularly when a constant DC voltage is applied. At DC voltages near the threshold voltage for droplet production, the microinjector often operates in a single droplet mode, in which individual droplets are produced at significant intervals. Increasing the voltage somewhat often creates a linear stream of droplets, due to their faster production. Increasing the voltage more usually causes large numbers of more highly charged droplets to form. The electrostatic repulsion between these droplets will cause them to form a dispersed cloud or mist having a spray dispersion angle that may range from about 20° to about 120° or more. This effect becomes greater with higher dielectric constant fluids.

Pulsing the applied voltage provide yet another method of controlling droplet formation and allows higher mass flow rates to be achieved. Pulsing is used herein to refer to a variety of waveforms (such as, without limitation, square, sawtooth, sinusoidal, etc.) in which the voltage is variable with respect to time. The pulsed voltage may be a simple alternating current. Pulsing frequency is advantageously in the range of from 10 to 5000 Hz, preferably 50-1000 Hz, especially about 50-200 Hz. Pulsing the voltage tends to reduce the amount of applied voltage needed to initiate droplet formation, produce smaller droplets at a given voltage, geometry and mass flow rate, and to favor a spray mode of operation. In addition, power requirements tend to be greatly reduced when a pulsed voltage source is used. Exemplary applied voltages (peak-to-peak) are from about 1 to 25 kV, especially from about 3-10 kV, when the voltage is pulsed in the range of 50-200 Hz, although this will depend somewhat on microinjector geometry, mass flow rates and fluid characteristics.

Currents per microinjector are typically in the range of 10 μA to about 10 mA, especially from about 100 μA to about 1 mA, when a constant DC voltage is applied. However, current (and therefore power) requirements tend to be much smaller when a pulsed voltage is applied, at a given mass flow rate.

When the fluid is relatively non-polar, the droplets tend to be highly uniform. Although this invention is not limited to any theory, applicants believe that the electrical field generated by the miniaturized microinjectors helps to suppress the formation of smaller, satellite droplets, through generation of a dielectrophoretic (DEP) force. DEP force exists when the following two conditions are simultaneously satisfied: (a) there is a gradient of the electric field strength and (b) there is a change in the dielectric constant across the interface separating the droplets and the air (or other fluid)

into which the droplets are dispersed. The DEP force experienced by a droplet can be expressed as:

$$F_e = \frac{\pi}{4} d^3 \varepsilon_0 k_1 \left[\frac{k_2 - k_1}{k_2 + 2k_1}\right] \nabla |E|^2 \quad (6)$$

where d is the particle diameter, $e_0$ is the dielectric constant in vacuum, $k_1$ and $k_2$ are the relative dielectric constants of the liquid droplets and the surrounding fluid, and E is the electric field strength. As the magnitude of the force depends on the term $k_2$-$k_1$, it is seen that the DEP force increases as the difference in the dielectric constants increases. Values of $k_2$-$k_1$ of at least 0.5 are desirable, and values of at least about 0.8, especially of at least 1.0, are preferred. k is 1 for air and approximately 2 for non-polar fluids such as diesel fuel and most other heavy liquid fuels such as JP5 and kerosene. This difference in dielectric constant provides a significant change in the dielectric constant giving rise to a measurable force acting on the interfaces between the two fluids (i.e., the air and liquid fuel, in the case of injecting a fuel into air).

Conversely, more polar (higher dielectric constant) materials such as water often are dispersed with a broader particle size distribution.

Mixtures of materials are often dispersed in a bimodal or multimodal pattern, even if those materials are miscible, if their dielectric constants are significantly different. Under those circumstances, the component having the higher dielectric constant tends to form a spray cloud with a relatively wide spray dispersion angle. The lower dielectric constant component tends to form a spray cloud with a much narrower spray dispersion angle. The resulting spray tends consist of a region, typically along the longitudinal axis of the spray cloud, which is rich in the lower dielectric constant material (because the droplets are mainly droplets of the lower dielectric constant material, or because the droplets are enriched in the lower dielectric constant material, or both), and another region, typically near the boundaries of the spray cloud, that is rich in the higher dielectric constant material (because the droplets are mainly droplets of the higher dielectric constant material, or because the droplets are enriched in the higher dielectric constant material, or both.

This phenomenon provides the possibility of separating components of a mixture by isolating the portion of the spray that is rich in one or the other material. The isolated material may be re-atomized one or more times to improve the separation. This separation technique is useful for isolating a component from a small volume of a mixture, even if the materials are miscible, without using energy-intensive or expensive techniques such as distillation.

The mass flow rate of the fluid to the microinjector is another control parameter. In many cases it is not necessary to supply the fluid to the microinjectors under any hydrodynamic pressure (i.e. fluid pressure other than that created by the application of voltage to the pin emitter) at all, so long as the fluid is brought into contact with the pin emitter. However, if fluid is not constantly supplied to the pin emitter, droplet formation may become intermittent or droplet size inconsistent. A small applied hydrodynamic pressure can assure that a constant supply of fluid reaches the pin emitter. It also tends to reduce the strength of the electrical field needed for droplet formation. Mass flow rate can affect droplet size, so controlling this variable through the control of hydrodynamic pressure offers another means of controlling droplet size. On the other hand, if the hydrodynamic pressure is too high, mass flow rates exceed the rates at which droplets can form, or cause voltage requirements to increase, resulting in leakage, inconsistent performance or increased power requirements. Typically, an applied hydrodynamic pressure of about zero to about 5, preferably from about 0.1 to about 2" of water is sufficient to provide an acceptable mass flow rate of the fluid to the microinjector. More or less viscous liquids may require more or less hydrodynamic pressure to optimize mass flow rates and overall operation. Applied hydrodynamic pressure preferably is such that droplet formation and/or leakage of the fluid through the orifice will not occur unless the microinjector is operated through application of a voltage to the pin emitter.

Because only low (or no) applied hydrodynamic pressures are needed for good operation, the atomizer does not require bulky construction (to withstand high pressures) or large or expensive pumping systems. Typically, small positive displacement pumps (such as piezoelectric pumps) are preferred, as these pumps are capable of providing a constant applied hydrodynamic pressure to the microinjector. Moving parts are also minimized or eliminated, as the atomization is accomplished wholly or primarily through the applied voltages.

The atomizer of the invention is capable of very rapid and precise control as droplet formation is dependent primarily on the applied voltages rather than on changes in the operation of moving parts (i.e., no inertia associated with mechanical components or moving parts is present). This allows the atomizer to respond in real-time to changes in operating conditions in applications such as combustion engines.

Figure 2:
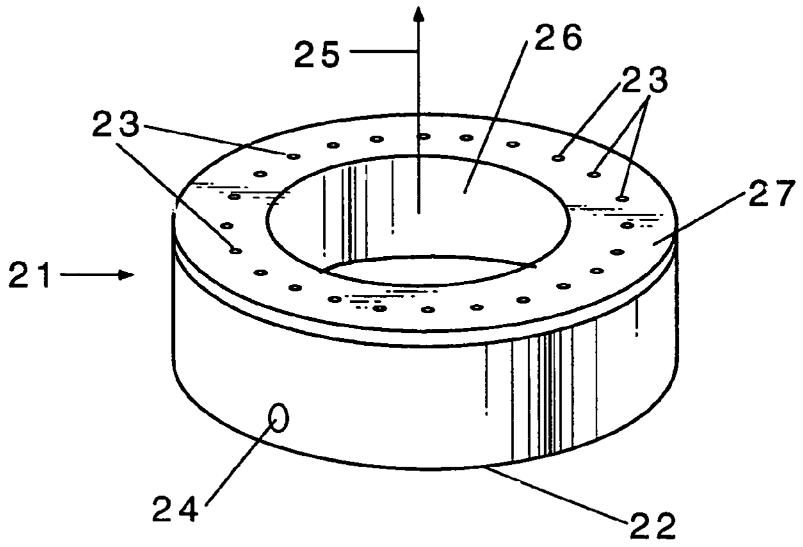
FIG. 2 is an isometric view of an embodiment of an atomizer having a plurality of microinjectors of the invention.

For many applications, the atomizer contains multiple microinjectors, so as to form multiple droplet streams. Multiple microinjectors can be arranged in any geometrical relationship that is suitable for a particular application. An example of such an embodiment is shown in FIG. 2. In FIG. 2, atomizer array 21 includes base 22. Base 22 is ring shaped, with central opening 26. Base 22 defines an enclosed internal liquid reservoir. A plurality of microinjectors 23 as described above is provided on top surface 27 of base 22. Each such microinjector 23 is in liquid communication with the enclosed reservoir, as is inlet 24. The atomizer also includes a means for connecting the pin emitters of the microinjectors to a voltage source (not shown). In this embodiment, microinjectors 23 are arranged in a circular pattern. However, the microinjectors can be arranged in any two or even three-dimensional array, as is suitable for a particular application.

When the atomizer has multiple microinjectors, it is possible to control different microinjectors individually. In preferred aspects of the invention, the atomizer will include at least two sets of microinjectors, each of which sets is operable independently of the other. The number of independently operable sets may be as few as two, but each set may include as few as one microinjector, in which case the number of independently operable sets will equal the number of microinjectors. Any intermediate number of independently operable sets may exist, and any number of microinjectors may be included in any set. Independent operation of the microinjectors is accomplished by separately controlling the electrical field induced gradients for each set of the microinjectors, i.e., by controlling applied voltage and/or currents independently for each set of microinjectors. Independent voltage control is straightforwardly achieved through the appropriate design of circuitry, such as providing independent wiring and control systems for each set of microinjectors. Individualized microinjector control enables one to produce droplets of different sizes from each set of microinjectors, easily change the size of droplets made by each set of microinjectors, and to easily vary the rate at which droplets are produced by each set of microinjectors. It further allows one to produce various spray patterns using the atomizer, by selecting the geometric arrangement of the microinjector sets and/or by controlling the output of each set of microinjectors. Multi-mode operation, in which different microinjectors produce droplets at different rates or of different sizes, can also be achieved without changing driving pressure requirements between the different sets of microinjectors. Reduced flow rates can be achieved by operating only a portion of the sets of microinjectors. This allows for simple linear scaling of mass flow rates, as mass flow rate is a function of the number of active microinjectors in operation (assuming the microinjectors are all designed and operated in the same manner).

The atomizer of the invention is particularly suitable for producing fluid droplets of from about 1 to about 150, more particularly from about 5 to about 50, especially from about 5 to about 30 μm in diameter. It is useful in a wide range of applications in which (1) fine liquid droplets are required to be produced, especially when the droplets are desired to be of a uniform, controllable size, or (2) very small but controlled quantities of fluids are dispensed. An example of the first type of application is a carburetion system for internal combustion engines. An example of the second type of application is the preparation of samples for matrix assisted laser desorption ionization (MALDI) mass spectrometer analyses.

In internal combustion engine applications, performance can be enhanced if very fine (order of 5-30 μm) liquid fuel droplets (or liquid-solid fuel mixtures) of uniform size are produced and mixed with air (or oxygen or other liquid, vapor or solid oxidizers in the form of a stream such as an air breathing engine or spray droplets for rocket engines operating outside the atmosphere) for injection into the engine combustion chamber(s). This can be achieved by incorporating the atomizer of the invention into a carburetion system which (1) uses the atomizer to produce fuel droplets which (2) are then mixed with air at appropriate ratios and (3) provides the fuel/air mixture to the combustion chambers. The atomizer is therefore configured to inject fuel droplets into a mixing zone where the droplets are mixed with the air, vaporize, and are provided the combustion chamber(s). The fuel/air mixture may be pulled into the combustion chamber via vacuum or injected into the chamber through a fuel injection system. The atomizer is adaptable for use in spark ignition engines as well as compression ignition engines. However, the benefits of the atomizer are particularly seen in compression ignition engines, where fine particle droplets of controllable size are produced using very low operating pressures, and in jet engines, where it is no longer necessary to depend on air turbulence to atomize the fuel. Suitable fuels include gasoline, diesel fuel, kerosene, various jet fuels, and the like.

The annular array shown in FIG. 2 is adaptable for use in such a carburetion system. Dispersed fuel droplets emerging from microinjectors 23 are mixed with air which flows through central opening 26 in the direction indicated by arrow 25. An advantage of this geometry is that the fuel droplets are sprayed into the shear layer where high turbulence intensity will provide high mass transfer rates. The resulting mixture can then be transferred to a combustion chamber for ignition. As shown in FIG. 2, the direction of droplet injection is roughly parallel to the direction of airflow. If desired, the droplets can be injected into the airflow at some angle (including injecting the droplets into central opening 26, perpendicular to the direction of the flow of the air). Similarly, additional air may flow, again in the general direction indicated by arrow 25, outside of the atomizer to further improve mixing.

Atomizers used in combustion engine applications preferably include a plurality of microinjectors, in two or more independently operable sets as described before. Independent operation of the microinjectors enables precise and rapid control of overall flow rates (as total flow depends on the number of microinjectors in operation), fuel/air ratios (for the same reason), fuel droplet particle size distribution (if different sets of microinjectors produce different size droplets due to geometric design, or via variations in applied voltages) and droplet spray patterns.

This ability to control the operation of the atomizer permits its operation to be optimized on a real-time basis to adjust for changes in engine operating conditions or power requirements. The atomizer is preferably computer-controlled in carburetion applications, the computer manipulating the voltage supplied to one or more sets of microinjectors according to an algorithm that relates controls and/or information regarding engine or other conditions to the operation of the various sets of microinjectors. If preferred embodiments, the computer in addition receives information regarding at least one engine or other condition (such as operating temperature, oxygen availability, operating speeds, etc.) and adjusts the operations of one or more sets of microinjectors in response to that information.

The invention also provides a method by which small volumes of fluids can be atomized effectively. This characteristic makes the atomizer of the invention suitable in applications where small volumes of finely dispersed droplets are desired. Injection rates of less than 1 μL/minute, especially from about 1-100 μL/minute are attainable, thereby providing for controlled dispensing of very small quantities of materials. If desired, higher mass flow rates can be obtained by changing spray modes, increasing voltages, applying a pulsed voltage or increasing the hydrodynamic pressure. It is an advantage of this invention that in many cases, a wide range of mass flow rates can be achieved using a particular microinjector and a particular fluid, by varying one or more of these parameters.

An example of such an application is the preparation of samples for matrix-assisted laser desorption ionization (MALDI) mass spectrometry. This technique is useful to characterize a number of biological materials such a proteins and genetic material. In MALDI methods, a sample is treated with a laser to ionize and volatilize sample molecules. The ionized and volatilized molecules are then electrostatically accelerated into a detector, with the flight time being measured. The flight time is then used to estimate the weight of the ion, and the weight is used as a tool for identifying the molecule. A very small amount of a sample is affixed to a sample slide, together with a chromophore (which absorbs laser light well). Because the sample is often an air-borne biological material, samples are often collected by concentrating an air sample and directing the concentrated air sample onto the sample slide. It is desirable to treat the air-borne biological matter with various fluids in order to break open the cell wall or membrane to expose the genetic material or proteins inside, add the chromophore to the sample, and/or apply a wetting or electrostatic agent which may simply help affix the material to the slide. A preferred way of accomplishing this is to expose the biological matter to fine droplets of these fluids as the sample slide is prepared.

Figure 3:
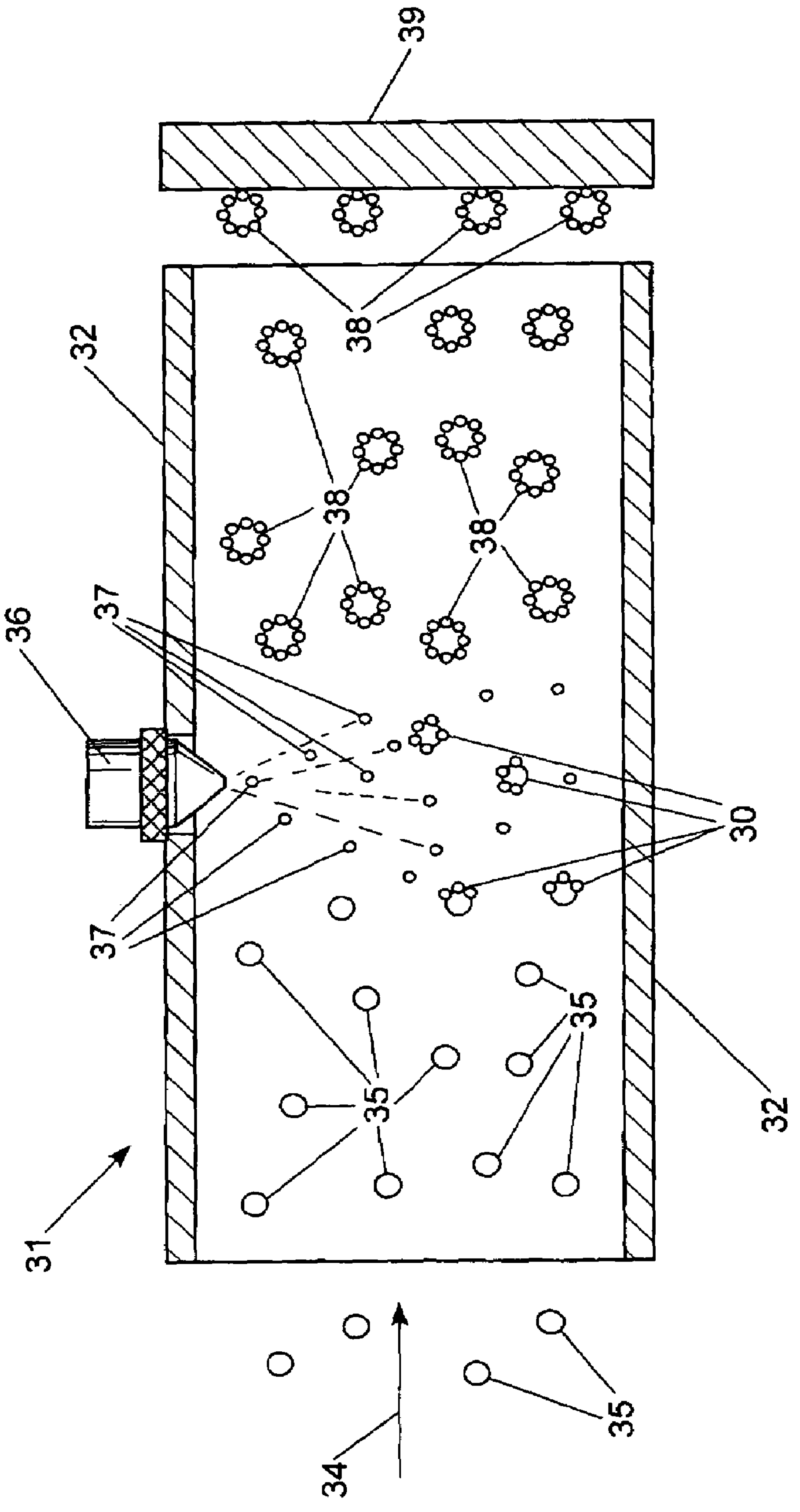
FIG. 3 is a side schematic view, partially in section, of a method for preparing a sample for analysis in accordance with the invention.

The atomizer of this invention is particularly well suited to creating and applying treating fluids for MALDI sample preparation. Such a process is illustrated in FIG. 3. In FIG. 3, material 35 to be analyzed is dispersed in air or other gaseous carrier and allowed to flow in the direction indicated by arrow 34 through spray chamber 31 defined by walls 32 and onward to contact sample slide 39. The interior of the spray chamber includes microinjector 36 of the invention, or, if more than one fluid is to be applied, a like number of microinjectors. As the sample particles 35 pass through spray chamber 31, the microinjector(s) 36 are activated, each creating a spray cloud of droplets 37 which contact sample particles 35, thereby applying the desired fluids to the sample (reference numerals 38). Typically, at least one of the sprayed fluids will be a solution of a chromophore such as trifluoroacetic acid. As each microinjector can be operated individually, controlled, independent amounts of all fluids can be applied. Further, operating conditions for each micro-injector can be independently selected so as to optimize droplet size and injection rates for each fluid.

The following examples are provided to illustrate the invention but not to limit the scope thereof. All parts and percentages are by weight unless otherwise indicated.

EXAMPLE 1

Isopropanol is fed to a 200 μm internal diameter stainless steel hypodermic needle with a pointed tip, with just enough applied hydrodynamic pressure (less than 1 inch water) to maintain a steady stream of fluid to the needle tip. No droplets or mass flow out of the needle is seen until a voltage is applied to the needle. A rectified, 330 Hz, 3-4 kV voltage is supplied to the needle. Droplets (<100 μm diameter) are formed in a single droplet mode. Injection velocity is estimated at 75 mm/s, with slowing due to air drag as the droplets traveled. Power consumption can not be measured because of an extremely low Lissajou current.

EXAMPLE 2

Isopropanol is fed into a 100 μm internal diameter stainless steel needle with a sharp tip, under a pressure equal to approximately 2" water. An unpulsed DC voltage is applied to the needle. Approximately 4000 volts DC are required to initiate atomization. At about 5000 volts, droplet formation assumes a spray mode with approximately 10 μm/minute mass flow rates. Current consumption at this voltage is about 40 μA. Droplets are very uniform in size and are approximately 30 μm in diameter. Further increasing the DC voltage decreases droplet size and increases mass flow rates, droplet velocity, and dispersion angle.

The applied voltage is then changed to a 100 Hz, 10 kV rectified voltage. A significantly higher mass flow rate, smaller droplet formation and smaller dispersion angle are generated, compared to what is produced with a similar DC voltage. Further, the system can tolerate higher applied hydrodynamic pressures when a pulsed voltage mode of operation is used, as droplet formation is significantly faster.

EXAMPLE 3

A mixture of ethanol and less than 0.1 weight percent bacterial spores is prepared. This mixture is atomized using a 620 μm (ID) stainless steel hypodermic needle with a square wave-driven (28 Hz), 20 kV applied voltage and no applied hydrodynamic pressure. Fine droplets in a spray mode are formed.

Similar results are obtained using a 220 μm (ID) needle, or when a 20 kV DC current is applied.

A mixture of water and less than 0.1 weight percent bacterial spores is prepared and atomized using the same 620 μm (ID) stainless steel hypodermic needle with a square wave-driven (28 Hz), 20 kV applied voltage and no applied hydrodynamic pressure. A bimodal spray distribution is observed. The spray assumes a generally conical pattern, with the bacterial spores concentrated in the region near the axis of the cone. Similar results are seen using a 220 μm needle or a 20 kV DC voltage.

EXAMPLE 4

A mixture of 70 weight percent acetonitrile and 30% water (with 0.1% trifluoroacetic acid) is atomized using a 100 μm (ID) stainless steel hypodermic needle with a 5 kV applied DC voltage and a small applied hydrodynamic pressure. A bimodal spray distribution is observed. The spray assumes a generally conical pattern, with the acetonitrile concentrated in the region near the axis of the cone and the water concentrated near the periphery of the cone.

Similar results are seen when a mixture of fluorocene and isopropanol is atomized under similar conditions.

EXAMPLE 5

A MALDI sample preparation apparatus is prepared with three independently controlled microinjectors that are oriented to spray atomized liquids into a sample preparation zone. The injectors are oriented such that each sprays into the same region of the sample preparation zone. The sample preparation zone is a channel, perpendicular to the orientation of the microinjectors. A concentrated gas stream containing the sample to be analyzed (such as bacteria spores or other biological materials) is passed through the sample preparation zone, contacted with the sprayed fluids, and then directed onto a sample slide for MALDI analysis. Each of the microinjectors is a 100 μm ID stainless steel needle connected to a square-wave driven, 20 kV, 5 mA (peak-to-peak power) source. Each microinjector is supplied with process fluids from a separate fluid reservoir. Each reservoir is pressurized to about 2" water pressure. This hydrodynamic pressure provides a constant flow of fluids to the microinjectors.

The first microinjector is fed with isopropanol. The second is fed with a mixture of 70% acetonitrile, 30% water and 0.1% trifluoroacetic acid. The third is fed sequentially with various process fluids, including water, water/glycerine, acetic acid, formic acid and ethanol.

The various microinjectors are first operated individually to assess the spray patterns that are produced. Ethanol, isopropanol, acetic acid and formic acid all form finely dispersed, uniformly sized droplets under these conditions. The acetonitrile/water/trifluoroacetic acid mixture forms a bimodal spray, with the acetonitrile droplets concentrated near the center of the spray and the water concentrated near the boundaries of the spray. The water/glycerine mixture forms a similar spray pattern.

Water alone forms a bimodal spray, with a subset of larger droplets being formed and dispersed at a wider dispersion angle than another group of finer droplets. This bimodal distribution may be due to impurities in the water being separated to a certain extent from the water molecules. This creates relatively purified droplets that are less highly charged and form a fine mist, and droplets that are richer in impurities (believed to include ionic species) which are more highly charged and form larger, more widely dispersed droplets.

What is claimed is:

1. A method of preparing a sample for matrix-assisted laser desorption ionization (MALDI) analysis, comprising A) flowing a dispersion of the sample in a gaseous carrier through a spray chamber;

B) contacting the dispersed sample in the spray chamber with an atomized fluid; and then C) depositing the sample.

2. A method of preparing a sample for analysis, comprising

A) flowing a dispersion of the sample in a gaseous carrier through a spray chamber;

B) contacting the dispersed sample in the spray chamber with an atomized fluid; and then C) depositing the sample, wherein the fluid is atomized by passing the fluid through an atomizer comprising 1) at least one microinjector including (a) an orifice through which the liquid is brought in contact with a pin emitter and (b) a conductive pin emitter extending outwardly from said orifice, the pin emitter having a radius of curvature in at least one location external to said orifice of no greater than 500 μm;

2) means for introducing the liquid to be atomized through the orifice and to the pin emitter; and 3) means for connecting said pin emitter to a voltage source.

3. The method of claim 1, wherein the fluid includes a chromophore.

4. The method of claim 1, wherein the fluid includes a wetting agent.

5. The method of claim 1, wherein the fluid includes a substance that breaks the cell wall or membrane of a biological material in the sample.

6. The method of claim 1, wherein the spray chamber includes a plurality of microinjectors, and more than one fluid is applied to the sample.

7. The method of claim 6, wherein each of said plurality of microinjectors is independently operable.

8. The method of claim 1, further comprising conducting a matrix-assisted laser desorption ionization analysis on the deposited sample.

9. A method of preparing a sample for analysis, comprising

A) flowing a dispersion of the sample in a gaseous carrier through a spray chamber;

B) contacting the dispersed sample in the spray chamber with an atomized fluid; and then C) depositing the sample, wherein the sample is airborne, and the sample is concentrated before flowing it into the spray chamber.

10. A method of preparing a sample for matrix-assisted laser desorption ionization (MALDI) analysis, comprising A) flowing a dispersion of the sample in a gaseous carrier through a spray chamber;

B) contacting the dispersed sample in the spray chamber with an atomized fluid; and then C) depositing the sample, wherein the sample is a biological material.

11. A method for analyzing a sample by matrix-assisted laser desorption ionization, comprising:

A) flowing a dispersion of the sample in a gaseous carrier through a spray chamber;

B) contacting the dispersed sample in the spray chamber with an atomized fluid containing a chromosphere; and then C) depositing the sample and then D) conducting matrix-assisted laser desorption ionization on the deposited sample.

12. The method of claim 11 wherein the fluid containing a chromosphere is atomized by passing the fluid through an atomizer comprising 1) at least one microinjector including (a) an orifice through which the liquid is brought in contact with a pin emitter and (b) a conductive pin emitter extending outwardly from said orifice, the pin emitter having a radius of curvature in at least one location external to said orifice of no greater than 500 μm; 2) means for introducing the liquid to be atomized through the orifice and to the pin emitter; and 3) means for connecting said pin emitter to a voltage source.

13. The method of claim 11 wherein an atomized fluid containing a wetting agent is applied to the sample in the spray chamber.

14. The method of claim 11 wherein an atomized fluid containing a substance that breaks the cell wall or membrane of a biological material in the sample is applied to the sample in the spray chamber.

* * * * *